March 28, 1950     J. R. MEADOW ET AL     2,502,333
PREHEATED CHARGE IN HYDROGEN FLUORIDE ALKYLATION
Filed Feb. 17, 1948     3 Sheets-Sheet 1
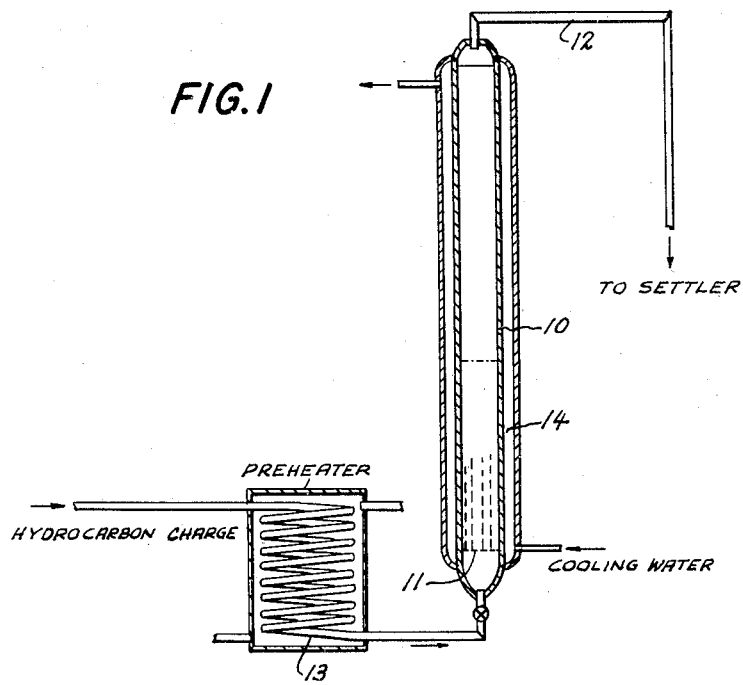
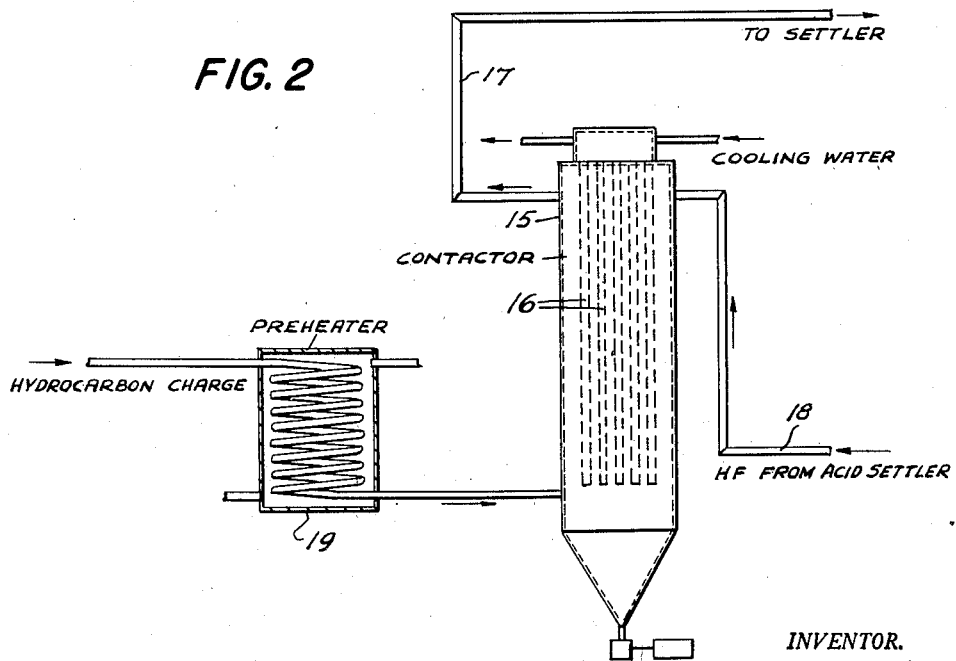
INVENTOR.
JACOB R. MEADOW,
BY ARLIE A. O'KELLY
AGENT OR ATTORNEY

UNITED STATES PATENT OFFICE 2,502,333

PREHEATED CHARGE IN HYDROGEN FLUORIDE ALKYLATION

Jacob R. Meadow, Lexington, Ky., and Arlie A. O'Kelly, Woodbury, N. J., assignors to Socony-Vacuum Oil Company, Incorporated, a corporation of New York Application February 17, 1948, Serial No. 8,967

4 Claims. (Cl. 260—683.4)

This invention relates to a process for synthesizing valuable hydrocarbons by a reaction between isoparaffins and olefins conducted in the presence of a liquid hydrogen fluoride catalyst.

Many syntheses are known whereby hydrocarbons are reacted in the presence of hydrogen fluoride to produce valuable hydrocarbon products. Important among these reactions are condensation of olefins with paraffins, particularly, isoparaffins, to give hydrocarbons boiling in the gasoline range which have high anti-knock values. The reaction is exothermic and the necessity for temperature control has been recognized since optimum reaction temperatures are fairly low, below say 100° F. It has been the conventional practice to control temperatures by adding reactants and catalysts brought to the desired temperature and to include heat exchange in the reaction zone to further aid in temperature control. In some cases, reactants are added at temperatures other than that desired, but this has always been done for the purpose of heat exchange between reaction mass and incoming charge. For example, in a commercial hydrogen fluoride alkylation where it is desired to keep the temperature low and the reaction is exothermic, the reactants have been added at a temperature below that desired in the reaction zone in order to relieve load on the internal cooling equipment. It has now been found that substantial preheating of the charge to a reaction mass for hydrocarbon synthesis in the presence of a liquid hydrogen fluoride catalyst produces important commercial advantages. These reactions, being exothermic in character, normally require removal of heat from the system and, although the present improvement involves laying a heavier load on the refrigeration apparatus, that disadvantage is compensated and usually a net advantage is gained by charge preheating.

An important object of the invention contemplates improvement in production of alkylate by condensation of olefins and isoparaffins in the presence of hydrogen fluoride.

Further objects and advantages of the invention will become apparent from the discussion below of specific embodiments of the invention illustrated and explained by the attached drawings wherein:

Figure 1 is a diagrammatic showing of one type of apparatus for hydrogen fluoride alkylation;

Figure 2 illustrates diagrammatically a different type of apparatus for alkylation in the presence of hydrogen fluoride.

Figure 3:
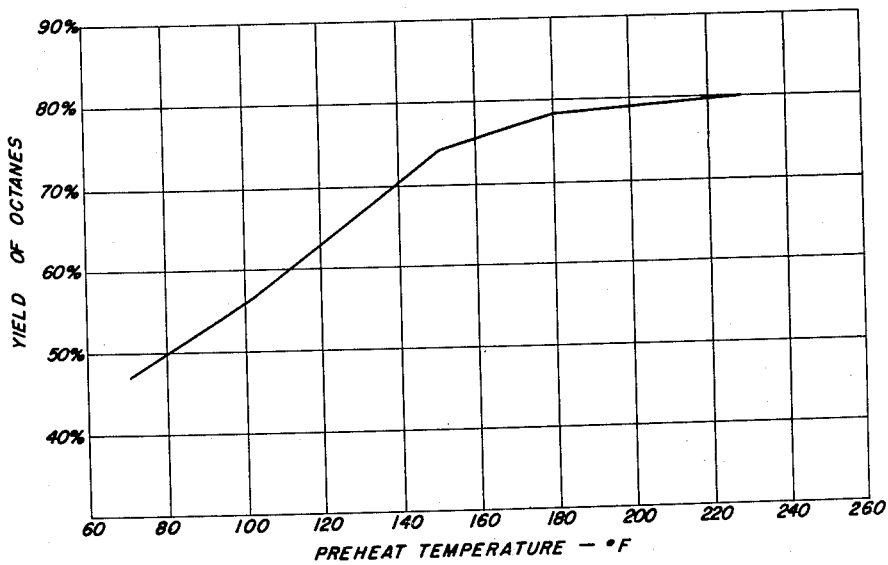
Figures 3 to 6, inclusive, are graphs showing the effect of preheating the charge in condensation of butene and isobutane in the presence of hydrogen fluoride.

The apparatus of Figure 1 is generally similar to that described in the copending application of Harry G. Doherty and Arlie A. O'Kelly, Serial No. 481,430, filed April 1, 1943, and now abandoned. According to this type of operation, the charge of olefin and isoparaffin is admitted in a fine state of subdivision to the bottom of a column 10, having a body of liquid hydrogen fluoride therein. The hydrocarbon charge may be admitted by atomizing nozzles or by the perforated plate 11 which subdivides the charge. The results obtained in this type of operation are related to the degree of subdivision and it is preferred that the charge be reduced to a fine spray, i. e., atomized. As the charge passes upwardly through the liquid catalyst, the desired condensation takes place and the hydrocarbon product is withdrawn from a point above the catalyst in either liquid or vapor phase admixed with unreacted hydrocarbons and a small amount of catalyst. This mixture is passed by a pipe 12 to conventional settling and purification equipment wherein the hydrogen fluoride is separated by stratification for return to the reaction tower and the hydrocarbons are fractionated to give a gasoline fraction, a heavier bottom fraction, and a fraction consisting primarily of unreacted hydrocarbons which are returned to the process.

According to the present invention, the charge is passed through a preheater 13 wherein it is brought to a temperature substantially above that desired in the alkylation tower before being admitted to the tower through orifice plate 11. The body of catalyst is, therefore, heated by the sensible heat of the charge as well as the exothermic heat of the reaction and means must be provided to remove the heat and maintain the reaction zone at a desired temperature. As will be shown hereinafter, higher degrees of preheat give better results but, within the range of temperatures normally used, better results are obtained with lower temperatures within the reaction zone. The cooling means can be any suitable apparatus for the purpose and the means shown in the Figure 1 comprise a simple cooling jacket 14 around a slender reaction zone.

The apparatus of Figure 2 is the usual contactor for reacting hydrocarbons in the presence of liquid acid catalyst and comprises a reaction chamber 15 equipped with a large-capacity heat exchanger 16 for circulation of cooling water in heat exchange relation with the reaction mixture. The internal structure of such contactors is well known in the art and need not be reviewed here. In this type of operation, violent agitation of the reaction mixture is desirable and an effective emulsion of hydrocarbons and catalyst is maintained. A portion of that emulsion is continuously withdrawn by a pipe 17 and passed to a settler from which separated acid catalyst is returned by pipe 18 to the contactor.

From the standpoint of process, the two types of apparatus shown have several major differences. The apparatus of Figure 1 involves contact times of the order of a few seconds—say, 10 to 30 seconds—while the contactor of Figure 2 is adapted to a process wherein catalyst and reactants are maintained in contact up to twenty minutes or more. Further, the reaction is conducted in an emulsion in apparatus of the type shown in Figure 2. In spite of these differences, both processes are amenable to major improvement by preheating of the charge and placing a heavier load on heat-exchange equipment to withdraw the additional heat thus put into the system. As is the case in connection with Figure 1, the apparatus of Figure 2 requires only the introduction of a preheater 19 in the line for supplying charge to the contactor.

In specific connection with hydrogen fluoride alkylation it has been noted that preheating of the charge gives a higher yield of octanes, the desired product when butenes are used as olefins, with a corresponding decrease in higher boiling components. There is considerably less consumption of the hydrogen fluoride catalyst accompanied by a substantially lower fluorine content in the crude alkylate, and in the aviation gasoline fraction of the alkylate. The contamination of the hydrogen fluoride catalyst by organic fluorides is also reduced to a major extent. It has also been found that the reaction time can be reduced when using a preheated charge, thus making possible a greater capacity of the same equipment operated in the same reaction temperature.

In the following tables there are given a number of specific examples of hydrogen fluoride alkylation using an isobutane-mixed butene charge. In each case, about 4500 grams of the same charge was pumped at different rates (as indicated) through 2 pounds of liquid hydrogen fluoride in a 2-inch inside-diameter pipe. The results shown in Table 1 were observed, using different charge rates as indicated in the table. The molar ratio of isoparaffin to olefin was 5.6 to 1. The examples shown in Table 2 were made at the same pumping rate and a molar ratio of 12.8 to 1 with varying preheat temperatures, as reported. The series of runs reported in Table 3 were made at a molar ratio of 15 to 1 with only the preheat temperatures varied appreciably.

TABLE 1

*Effect of preheating hydrocarbon stream before alkylation.*

| Example | Pumping Rate | Preheat Temp. | Reactor Temp. | Per cent Octanes, 95–125° C. | Per cent Aviation Cut, 20–150° C. | Per cent Boiling above 150° C. | Fluorine Analysis of Alkylate |
|---|---|---|---|---|---|---|---|
| | Cc./min. | °F. | °F. | | | | Per cent |
| 1 | 20 | 168 | 63 | 61:2 | 76:6 | 21:1 | 0:074 |
| 2 | 20 | 70 | 60 | 46:3 | 69:9 | 29:4 | 0:177 |
| 3 | 40 | 168 | 66 | 67:2 | 85:4 | 13:1 | 0:0027 |
| 4 | 40 | 71 | 62 | 46:5 | 72:2 | 27:4 | 0:0086 |
| 5 | 60 | 153 | 66 | 66:4 | 86:0 | 13:9 | 0:0033 |
| 6 | 60 | 80 | 62 | 50:8 | 78:6 | 23:9 | 0:0140 |

NOTE: Examples Nos. 1, 3 and 5 with preheat are to be compared with the corresponding Examples 2, 4 and 6 without preheat at the pumping rates indicated in each case.

TABLE 2

*Effect of increasing the preheat temperature*

| Example | Pumping Rate | Preheat Temp. | Reactor Temp. | Per cent Octanes, 95–125° C. | Per cent Aviation Cut, 20–150° C. | Per cent Boiling above 150° C. | Fluorine Analysis of Crude Alkylate |
|---|---|---|---|---|---|---|---|
| | Cc/min. | °F. | °F. | | | | Per cent |
| 7 | 60 | 70 | 47 | 47:3 | 61:0 | 28:6 | 0:147 |
| 8 | 60 | 102 | 51 | 56:5 | 75:5 | 23:6 | |
| 9 | 60 | 152 | 48 | 74:5 | 85:5 | 12:5 | 0:093 |
| 10 | 60 | 179 | 55 | 79:0 | 90:4 | 9:5 | |
| 11 | 60 | 227 | 56 | 80:0 | 90:5 | 8:8 | 0:018 |

TABLE 3

*Increasing the preheat temperature using a 15:1 isoparaffin-olefin ratio*

| Example | Pumping Rate | Preheat Temp. | Reactor Temp. | Per cent Octanes, 20–150° C. | Per cent Total Aviation Cut, 20–150° C. | Per cent Residue Boiling above 150° C. | Fluorine Content of Crude Alkylate |
|---|---|---|---|---|---|---|---|
| | Cc./min. | °F. | °F. | | | | Per cent |
| 12 | 100 | 140 | 49 | 72.6 | 87.7 | 11.5 | 0.110 |
| 13 | 100 | 162 | 54 | 73.0 | 89.2 | 10.2 | 0.067 |
| 14 | 100 | 180 | 58 | 78.2 | 90.9 | 8.6 | 0.031 |
| 15 | 100 | 200 | 60 | 79.2 | 91.3 | 8.6 | |
| 16 | 100 | 220 | 58 | 81.9 | 91.4 | 8.2 | |

Figure 4:
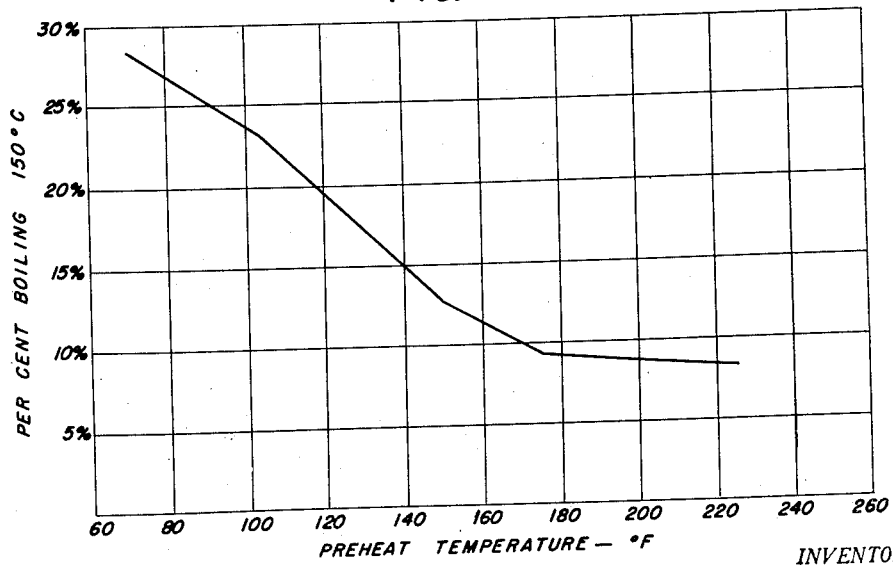
Figure 5:
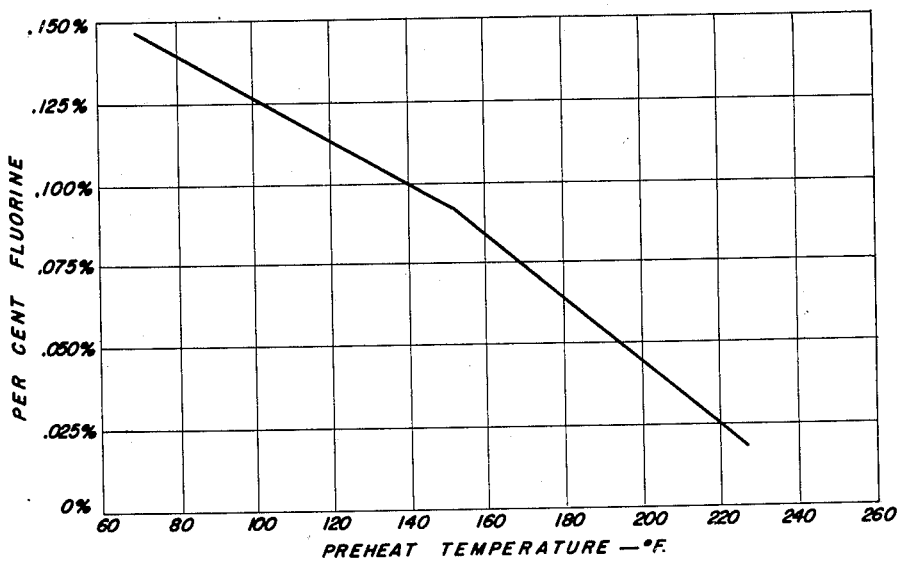

The advantages of the present invention are further shown by Figures 3 to 6, which illustrate graphically the effect of preheating on different aspects of the process. The data for these graphs were compiled by runs similar to those reported in Tables 1 to 3, inclusive. Figure 3 shows the effect of preheating the charge on the percentage yield of octanes at reactor temperatures of 47° to 56° F. and a pumping rate of 60 cc. per minute. The graph of Figure 4 illustrates a striking manner in which higher boiling components are reduced under those same conditions by preheating. A startling reduction in fluoride content of the crude alkylate is shown in Figure 5 relating to runs made at the same tower temperature and pumping rate as noted for Figures 3 and 4. It may be mentioned that alkyl fluorides have a very marked effect in reducing susceptibility of the alkylate to improvement by addition of tetraethyl lead.

Figure 6:
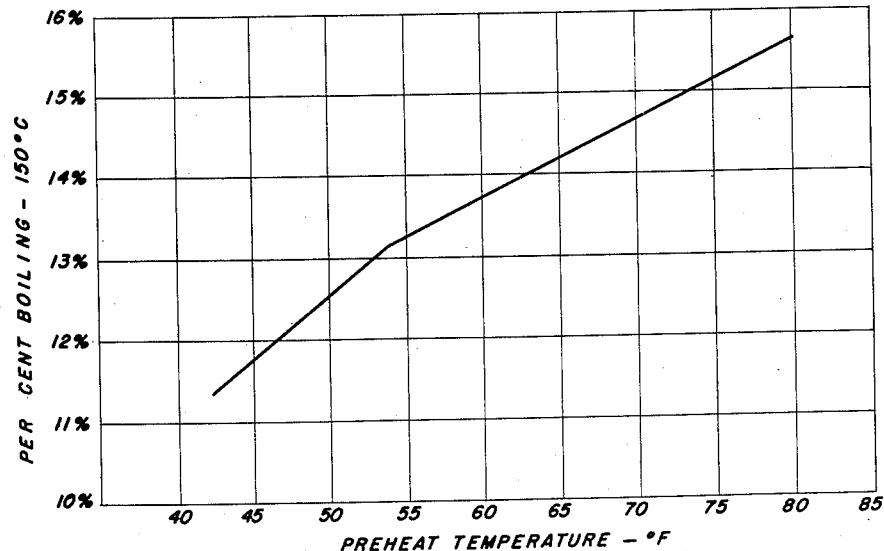

For purposes of comparison, Figure 6 is submitted to show that the effect of preheating is not simply a matter of increasing reaction temperature. This graph shows the increase in high boiling components, boiling point about 150° C., as the reactor temperature is increased, while maintaining the preheat temperature at 210° F. and a pumping rate of 60 cc. per minute.

The effect of the degree of preheating on alkylation of isobutane with propylene is illustrated by Examples 17 and 18:

Example 17

A mixture of isobutane and propylene containing 10% by weight of the latter was introduced into the alkylation tower at 70–80° F. with a pumping rate of 60 cc. per minute. The temperature of the alkylation tower was maintained throughout the experiment at approximately 45° F. An alkylation yield of less than 50% of theory, based on the weight of propylene charged, was thus obtained. This low yield was further confirmed by an absorption test on the effluent stream which showed over 3% olefin content. Product contained a large amount of organic fluorides and was not distilled.

Example 18

A similar charge containing 10% by weight of propylene was preheated to a temperature of 157° F. and passed through the alkylation tower which was kept at a temperature of 40–50° F. at a pumping rate of 60 cc. per minute. The yield of alkylate thus obtained was about 91% of theory, and on distillation was broken down as follows:

| Fraction | | Percent by Weight of Total Alkylate |
|---|---|---|
| 1 | 20–30° C. (Pentanes) | 3.1 |
| 2 | 30–75° C. | 5.2 |
| 3 | 75–85° C. (largely 2,4-dimethyl pentane) | 6.0 |
| 4 | 85–95° C. (largely 2,3-dimethyl pentane) | 33.0 |
| 5 | 95–125° C. (largely mixed octanes) | 29.7 |
| 6 | 125–150° C. | 2.5 |
| 7 | Residue > 150° C. | 20.1 |
| | Total | 99.6 |

In general, any substantial preheating of the charge above the temperature of the reaction mixture to which it is introduced will produce an improvement in the nature of that shown above. It appears that preheat temperatures greater than 150° F. give better results and we prefer to use preheat temperatures in excess of 200° F. As will be seen from Figure 6, the results obtained improved continuously as the reaction temperature is reduced. For practical reasons, we prefer to use temperatures on the order of 40–60° F. because of the difficulty of adequate cooling at lower temperatures. It would seem that reaction temperatures above 100° F. are undesirable. As will be noted, the curves indicating improvement, as preheat is increased, begin to flatten out around 200° F. and above, and as preheat approaches the range of 250–300° F. the lesser improvements obtained do not usually justify the increased expense arising from the refrigeration requirements.

This application is a continuation-in-part of our copending application Serial No. 490,487 filed June 11, 1943 and now abandoned.

We claim:

1. A process for the catalytic alkylation of isoparaffins with olefins which comprises maintaining a body of liquid hydrogen fluoride at a temperature below about 100° F. and introducing thereto a charge mixture of isoparaffin and olefin at a temperature of about 150° F. to about 300° F.

2. A process for the catalytic alkylation of isoparaffins with olefins which comprises maintaining a body of liquid hydrogen fluoride at a temperature of about 40° F. to about 60° F. and introducing thereto a charge mixture of isoparaffin and olefin at a temperature of about 150° F. to about 300° F.

3. A process for the catalytic alkylation of isoparaffins with olefins which comprises maintaining a body of liquid hydrogen fluoride at a temperature below about 100° F. and introducing thereto a charge mixture of isoparaffin and olefin at a temperature of about 200° F. to about 250° F.

4. A process for the catalytic alkylation of isoparaffins with olefins which comprises maintaining a body of liquid hydrogen fluoride at a temperature of about 40° F. to about 60° F. and introducing thereto a charge mixture of isoparaffin and olefin at a temperature of about 200° F. to about 250° F.

JACOB R. MEADOW.
ARLIE A. O'KELLY.

REFERENCES CITED

The following references are of record in the file of this patent:

UNITED STATES PATENTS

| Number | Name | Date |
|---|---|---|
| 2,317,901 | Frey | Apr. 27, 1943 |
| 2,322,482 | Stahly et al. | June 22, 1943 |
| 2,335,704 | Smith | Nov. 30, 1943 |
| 2,365,426 | Molique | Dec. 19, 1944 |

Certificate of Correction

Patent No. 2,502,333                                          March 28, 1950

JACOB R. MEADOW ET AL.

It is hereby certified that error appears in the printed specification of the above numbered patent requiring correction as follows:

Column 4, Table 1, last four columns thereof, for

| | | | Per cent | | | | | Per cent |
|---|---|---|---|---|---|---|---|---|
| 61:2 | 76:6 | 21:1 | 0:074 | | 61.2 | 76.6 | 21.1 | 0.074 |
| 46:3 | 69:9 | 29:4 | 0:177 | | 46.3 | 69.9 | 29.4 | 0.177 |
| 67:2 | 85:4 | 13:1 | 0:0027 | read | 67.2 | 85.4 | 13.1 | 0.0027 |
| 46:5 | 72:2 | 27:4 | 0:0086 | | 46.5 | 72.2 | 27.4 | 0.0086 |
| 66:4 | 86:0 | 13:9 | 0:0033 | | 66.4 | 86.0 | 13.9 | 0.0033 |
| 50:8 | 78:6 | 23:9 | 0:0140 | | 50.8 | 78.6 | 23.9 | 0.0140 |

Table 2, last four columns thereof, for

| | | | Per cent | | | | | Per cent |
|---|---|---|---|---|---|---|---|---|
| 47:3 | 61:0 | 28:6 | 0:147 | | 47.3 | 61.0 | 28.6 | 0.147 |
| 56:5 | 75:5 | 23:6 | -------- | | 56.5 | 75.5 | 23.6 | -------- |
| 74:5 | 85:5 | 12:5 | 0:093 | read | 74.5 | 85.5 | 12.5 | 0.093 |
| 79:0 | 90:4 | 9:5 | -------- | | 79.0 | 90.4 | 9.5 | -------- |
| 80:0 | 90:5 | 8:8 | 0:018 | | 80.0 | 90.5 | 8.8 | 0.018 |

Table 3, in the heading to the fifth column thereof, for "20–150° C." read *95–125° C.*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*